(12) United States Patent
Fritz

(10) Patent No.: US 8,646,783 B2
(45) Date of Patent: Feb. 11, 2014

(54) FLAT GASKET

(75) Inventor: Wolfgang Fritz, Metzingen (DE)

(73) Assignee: ElringKlinger AG, Dettingen (DE)

( * ) Notice: Subject to any disclaimer, the term of this patent is extended or adjusted under 35 U.S.C. 154(b) by 1016 days.

(21) Appl. No.: 11/787,773

(22) Filed: Apr. 18, 2007

(65) Prior Publication Data
US 2008/0012235 A1    Jan. 17, 2008

(30) Foreign Application Priority Data
Jul. 15, 2006    (DE) .......................... 10 2006 032 895

(51) Int. Cl.
*F02F 11/00*    (2006.01)

(52) U.S. Cl.
USPC ............ 277/593; 277/594; 277/595; 277/591

(58) Field of Classification Search
USPC ................................................ 277/591–595
See application file for complete search history.

(56) References Cited

U.S. PATENT DOCUMENTS

| | | | | |
|---|---|---|---|---|
| 3,053,544 A * | 9/1962 | Gorsica | | 277/593 |
| 5,058,908 A * | 10/1991 | Udagawa | | 277/595 |
| 5,213,345 A | 5/1993 | Udagawa | | 277/235 |
| 5,240,261 A * | 8/1993 | Udagawa et al. | | 277/595 |
| 5,286,039 A * | 2/1994 | Kawaguchi et al. | | 277/593 |
| 5,310,196 A * | 5/1994 | Kawaguchi et al. | | 277/592 |
| 5,408,963 A | 4/1995 | Miyaoh et al. | | 123/193.3 |
| 5,522,604 A | 6/1996 | Weiss et al. | | 277/594 |
| 5,582,415 A * | 12/1996 | Yoshida et al. | | 277/592 |
| 5,601,292 A * | 2/1997 | Tanaka et al. | | 277/593 |
| 5,664,790 A * | 9/1997 | Tanaka et al. | | 277/595 |
| 5,695,200 A * | 12/1997 | Diez et al. | | 277/593 |
| 5,713,580 A * | 2/1998 | Ueta | | 277/593 |
| 5,875,548 A * | 3/1999 | Diez et al. | | 29/888.3 |
| 6,148,516 A * | 11/2000 | Diez et al. | | 29/888.3 |
| 6,250,644 B1 * | 6/2001 | Diez et al. | | 277/595 |
| 6,769,696 B2 * | 8/2004 | Diez et al. | | 277/593 |
| 6,951,338 B2 * | 10/2005 | Kestly | | 277/593 |
| 7,287,757 B2 * | 10/2007 | Chen et al. | | 277/593 |
| 7,422,218 B2 * | 9/2008 | Fritz | | 277/593 |
| 7,597,329 B2 * | 10/2009 | Yasuda | | 277/595 |

(Continued)

FOREIGN PATENT DOCUMENTS

DE    42 19 709 A    2/1994
DE    693 04 461 T2    9/1996

(Continued)

*Primary Examiner* — Vishal Patel
*Assistant Examiner* — Nicholas L Foster

(57) ABSTRACT

In order to provide a flat gasket comprising at least one gasket sheet, which comprises at least one through-opening and at least one sealing bead, which extends around the through-opening and is delimited at the side facing the through-opening by an inner bead foot, and at the side remote from the through-opening by an outer bead foot, and at least one deformation-limiting device, which comprises at least one stopper element disposed on a stopper-supporting surface of the gasket sheet, in which flat gasket the effective stopper height of the stopper element may easily be set to a value that differs from the thickness of the stopper element, the stopper-supporting surface is shifted in a direction extending at right angles to the stopper-supporting surface by an offset.

27 Claims, 7 Drawing Sheets

(56) References Cited

U.S. PATENT DOCUMENTS

| | | | |
|---|---|---|---|
| 8,042,815 B2* | 10/2011 | Okuno et al. | 277/593 |
| 8,267,407 B2* | 9/2012 | Schmucker | 277/594 |
| 2001/0017446 A1* | 8/2001 | Jinno | 277/594 |
| 2003/0042689 A1* | 3/2003 | Diez et al. | 277/593 |
| 2005/0134005 A1* | 6/2005 | Udagawa | 277/594 |
| 2006/0066059 A1 | 3/2006 | Fritz | 277/593 |
| 2006/0290072 A1* | 12/2006 | Chen et al. | 277/593 |
| 2008/0164660 A1* | 7/2008 | Yasuda | 277/595 |
| 2009/0033039 A1* | 2/2009 | Anderson et al. | 277/595 |
| 2009/0267308 A1* | 10/2009 | Schmucker | 277/592 |
| 2010/0117306 A1* | 5/2010 | Okuno et al. | 277/592 |
| 2012/0193877 A1* | 8/2012 | Okano et al. | 277/593 |

FOREIGN PATENT DOCUMENTS

| | | | |
|---|---|---|---|
| DE | 10123485 A1 * | 12/2002 |
| DE | 10 2004 047 540 A1 | 4/2006 |
| EP | 0 440 831 A1 | 8/1991 |
| EP | 0 511 445 A1 | 11/1992 |
| EP | 0 574 770 A1 | 12/1993 |
| EP | 0 950 807 A1 | 10/1999 |
| EP | 1 643 170 A1 | 4/2006 |
| JP | 63-121863 U | 8/1988 |
| JP | 06-047772 U | 6/1994 |
| JP | 2000-329232 A | 11/2000 |
| WO | WO 2006/061042 A1 | 6/2006 |

* cited by examiner

FLAT GASKET

CROSS-REFERENCE TO RELATED APPLICATIONS

The present invention refers to the subject matter disclosed in the German patent application No. 10 2006 032 895.7 of 15 Jul. 2006. The entire description of this earlier application is incorporated by reference into the present description ("incorporation by reference").

BACKGROUND OF THE INVENTION

Field of the Invention

The present invention relates to a flat gasket, in particular to a cylinder head gasket, comprising
at least one gasket sheet, which comprises at least one through-opening and
at least one sealing bead, which extends around the through-opening and is delimited at the side facing the through-opening by an inner bead foot and
at the side remote from the through-opening by an outer bead foot and has a bead crest extending between the inner bead foot and the outer bead foot, and
at least one deformation-limiting device, which limits the deformation of the sealing bead and comprises at least one stopper element disposed on a stopper-supporting surface of the gasket sheet.

In this case, during installation of the gasket the sealing bead has the effect that the force of the studs, by means of which the components to be sealed and the gasket are braced against one another, is concentrated into a line pressure along the bead crest.

The deformation-limiting device (also known as "stopper") protects the vertically deformable sealing bead from unacceptably high deformation. Such a deformation-limiting device is simultaneously a partial thickening of the flat gasket, by means of which the components adjoining the flat gasket are biased in such a way that the dynamic sealing gap oscillation is reduced.

Such a deformation-limiting device may be manufactured for example by welding an annular stopper element onto the gasket sheet or by bending over an annular edge region of the gasket sheet that surrounds the through-opening and folding it back as a stopper element onto the stopper-supporting surface of the gasket sheet.

BRIEF SUMMARY OF THE INVENTION

The effective stopper height in this case corresponds in each case to the thickness of the stopper element.

The underlying object of the present invention is to provide a flat gasket of the initially described type, in which the effective stopper height of the stopper element may easily be set to a value that is different from the thickness of the stopper element.

In a flat gasket having the features of the preamble of claim 1, this object is achieved according to the invention in that the stopper-supporting surface is shifted by an offset in a direction extending at right angles to the stopper-supporting surface relative to a part of the surface of the gasket sheet that adjoins the outer bead foot and is situated outside of the sealing bead and disposed at the same side of the gasket sheet as the stopper-supporting surface.

The underlying concept of the solution according to the invention is therefore to vary the effective stopper height, not by means of a variation of the thickness of the stopper element, but by means of a variation of the height level of the stopper-supporting surface.

In this case, the effective stopper height may in principle be increased or reduced relative to the thickness of the stopper element.

It is preferably provided that the effective stopper height is reduced relative to the thickness of the stopper element by means of the offset of the stopper-supporting surface.

In a preferred development of the invention, it is provided that the offset is at least approximately 10%, preferably approximately at least 20%, of the thickness of the stopper element.

It is further advantageous when the offset is at least approximately 20 μm, preferably approximately 40 μm.

In preferred embodiments of the invention, moreover, the offset is less than the thickness of the stopper element.

In particular, it is advantageous when the offset is less than 0.3 mm.

The stopper element may be disposed at the side of the gasket sheet, towards which the bead crest of the sealing bead is curved.

As an alternative to this, it may be provided that the stopper element is disposed at the side of the gasket sheet opposite the side, towards which the bead crest of the sealing bead is curved.

The flat gasket according to the invention may be of a single- or multi-layered design.

In particular, it may be provided that the flat gasket, besides the gasket sheet that is provided with the sealing bead and the stopper element, additionally comprises at least one further gasket sheet, which is provided with at least one sealing bead extending around the through-opening.

In this case, it may in particular be provided that the stopper element acts directly or indirectly, by virtue of the support of other gasket sheet parts, as a deformation-limiting device for a plurality of sealing beads.

In a preferred development of the invention, it is provided that the flat gasket, besides the gasket sheet that is provided with the sealing bead and the stopper element, additionally comprises at least two further gasket sheets, between which the gasket sheet provided with the sealing bead and the stopper element is disposed.

It may further be provided that the flat gasket, besides the gasket sheet that is provided with the sealing bead and the stopper element, additionally comprises at least one carrier sheet with a offset.

The height of this offset of the carrier sheet may correspond substantially to the offset of the stopper-supporting surface.

In this case, a offseted region of the carrier sheet, which projects from the non-offseted region of the carrier sheet and is preferably supported by means of the stopper element or by means of a part forming the stopper-supporting surface of the gasket sheet provided with the stopper element, may serve as a deformation-limiting device for a sealing bead on another gasket sheet of the flat gasket.

In order to be able to reduce the effective stopper height of such a deformation-limiting device relative to the height of the offset of the stopper-supporting surface, it may be provided that the offseted region of the carrier sheet that extends around the through-opening has a smaller thickness than the region of the carrier sheet that lies outside of the offseted region.

Such a reduction of the thickness of the offseted region of the carrier sheet may be achieved for example by means of an embossing operation.

In a preferred development of the invention, it is provided that the carrier sheet provided with the offset is immediately adjacent to the gasket sheet that is provided with the sealing bead and the stopper element.

In this case, it is possible that regions of the gasket sheet provided with the stopper element that are situated at different height levels are supported either against the non-offseted region of the carrier sheet or against the offseted region of the carrier sheet, i.e. at different height levels against the carrier sheet.

The offseted region of the carrier sheet may in particular be offseted towards the side that is remote from the gasket sheet provided with the sealing bead and the stopper element.

The flat gasket may further comprise at least one further gasket sheet, which is provided with at least one sealing bead extending around the through-opening and is disposed at the side of the carrier sheet that is remote from the gasket sheet provided with the sealing bead and the stopper element. In this case, the offseted region of the carrier sheet may serve as a deformation-limiting device for the sealing bead of said further gasket sheet.

The offset between the stopper element and the part of the surface of the gasket sheet that adjoins the outer bead foot of the sealing bead may be produced for example in that the gasket sheet provided with the sealing bead and the stopper element has a offset extending between the inner bead foot of the sealing bead and the stopper element.

In this case, it may in particular be provided that the offseted region of the gasket sheet is offseted in the direction of the side of the gasket sheet, towards which the bead crest of the sealing bead is curved.

As an alternative to this, it may be provided that the offseted region of the gasket sheet is offseted in the direction of the side of the gasket sheet that is remote from the side, towards which the bead crest of the sealing bead is curved.

When the offset between the stopper-supporting surface and the part of the surface of the gasket sheet that adjoins the outer bead foot is produced by means of a offset, then the sealing bead may be designed substantially symmetrically in relation to a plane extending through its bead crest and at right angles to the stopper-supporting surface.

In addition or as an alternative to producing an offset between the stopper-supporting surface and the part of the surface of the gasket sheet that adjoins the outer bead foot by means of a offset of the gasket sheet, it may also be provided that the sealing bead is designed asymmetrically in relation to a plane extending through its bead crest and at right angles to the stopper-supporting surface, wherein the inner bead foot extends at a different height level to the outer bead foot.

In said case, the outer bead foot may be offset relative to the inner bead foot in the direction of the side of the gasket sheet, towards which the bead crest of the sealing bead is curved.

As an alternative to this, it may be provided that the outer bead foot is offset relative to the inner bead foot in the direction of the side of the gasket sheet that is remote from the side of the gasket sheet, towards which the bead crest of the sealing bead is curved.

In the case of a symmetrically designed full bead, the inner bead foot is at a radial distance $b_i$ from the bead crest that is equal to the radial distance $b_a$ of the outer bead foot from the bead crest.

When the sealing bead is of such an asymmetrical design in relation to the plane extending through its bead crest and at right angles to the stopper-supporting surface that the inner bead foot extends at a different height level to the outer bead foot, then the radial distance $b_i$ of the inner bead foot from the bead crest may nevertheless be substantially equal to the radial distance $b_a$ of the outer bead foot from the bead crest.

In order in this case to achieve a force-deformation characteristic of the sealing bead that is comparable to a symmetrically designed full bead, it may however also be provided that the radial distance $b_i$ of the inner bead foot from the bead crest is different from the radial distance $b_a$ of the outer bead foot from the bead crest.

In particular, it may be provided that the radial distance from the bead crest is greater in the case of the bead foot that has a greater height difference relative to the bead crest than in the case of the bead foot that has a smaller height difference relative to the bead crest.

The stopper element may in principle be formed in any desired manner on the gasket sheet.

The stopper element may for example take the form of an element that is manufactured separately from the gasket sheet and then fastened, for example by welding, soldering or gluing, to the stopper-supporting surface of the gasket sheet.

The stopper element may further take the form of a coating produced on the stopper-supporting surface.

As an alternative to this, it may be provided that the stopper element takes the form of a bent-over region of the gasket sheet, which is provided with the sealing bead and the stopper element.

In this case, the stopper element is therefore formed integrally with the gasket sheet, on the stopper-supporting surface of which the stopper element is disposed.

In order, even when the metal material used for the gasket sheet has a low elongation at break, to be able to produce stopper elements of any desired width by turning over an edge region of the gasket sheet, it is advantageous when the stopper element has a plurality of notches, which extend from an edge of the stopper element remote from the through-opening out in the direction of the through-opening.

When the edge region of the gasket sheet is turned over, these notches widen at the edge of the stopper element remote from the through-opening, so that no or only slight peripheral stresses arise and so stopper elements of any desired width may be manufactured.

In this case, in a preferred development of the flat gasket it is provided that the mean length of the notch-free regions of the edge of the stopper element between the notches disposed successively in the longitudinal direction of the stopper element is larger than the mean extent of the notches in the longitudinal direction of the stopper element at the edge of the stopper element.

The stopper element may be formed by producing the notches in an edge region of a through-opening of the gasket sheet and then turning the edge region over.

The notches may be produced for example by mechanical cutting, by stamping or by laser cutting.

In a preferred development of the invention, it is provided that the notches are produced by substantially material-loss-free cutting into the gasket sheet. In this case, the lateral edges of the notches before turning-over extend substantially parallel to one another.

BRIEF DESCRIPTION OF THE SEVERAL VIEWS OF THE DRAWINGS

Further features and advantages of the invention are the subject matter of the following description and of the graphic representation of embodiments.

The drawings show.

Identical or functionally equivalent elements are denoted in all of the drawings by the same reference characters.

DETAILED DESCRIPTION OF THE INVENTION

Figure 1:
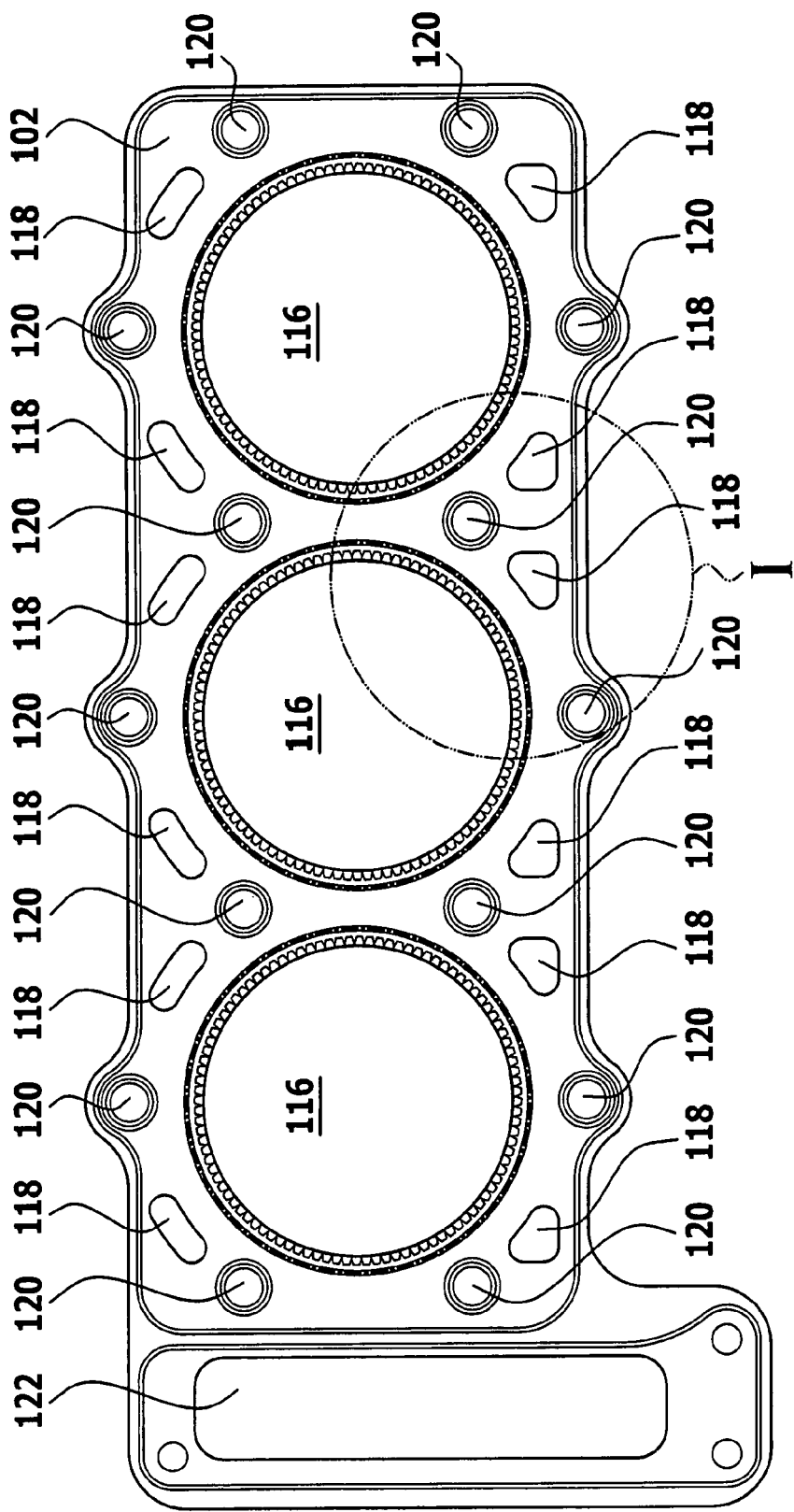
FIG. 1 a diagrammatic plan view of a metal gasket sheet of a cylinder head gasket, wherein the gasket sheet has combustion chamber through-openings, which are surrounded by sealing beads and on the edge of which stopper elements in the form of edge-raised folds are disposed.
Figure 2:
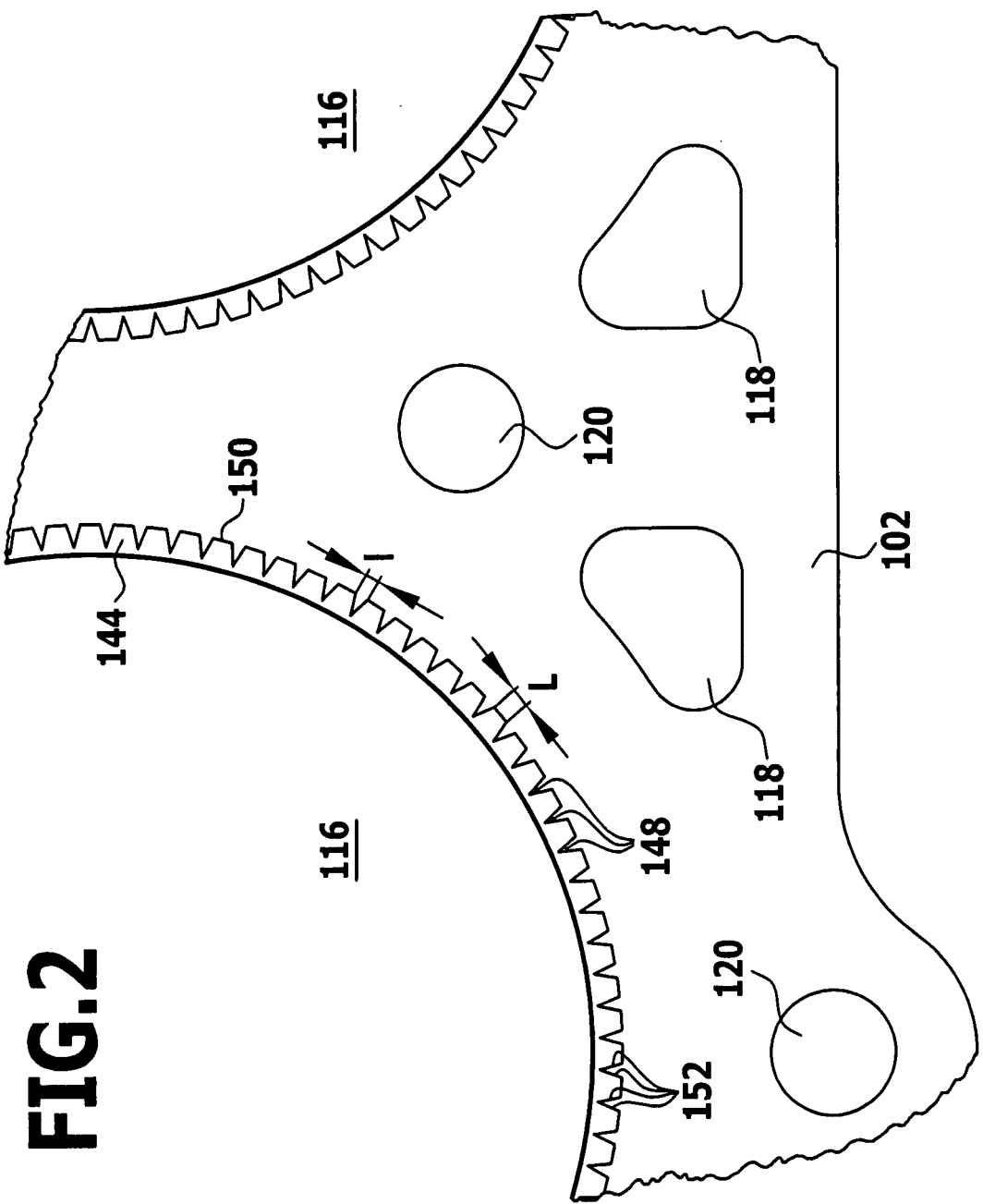
FIG. 2 an enlarged view of the region denoted by I in FIG. 1.
Figure 3:
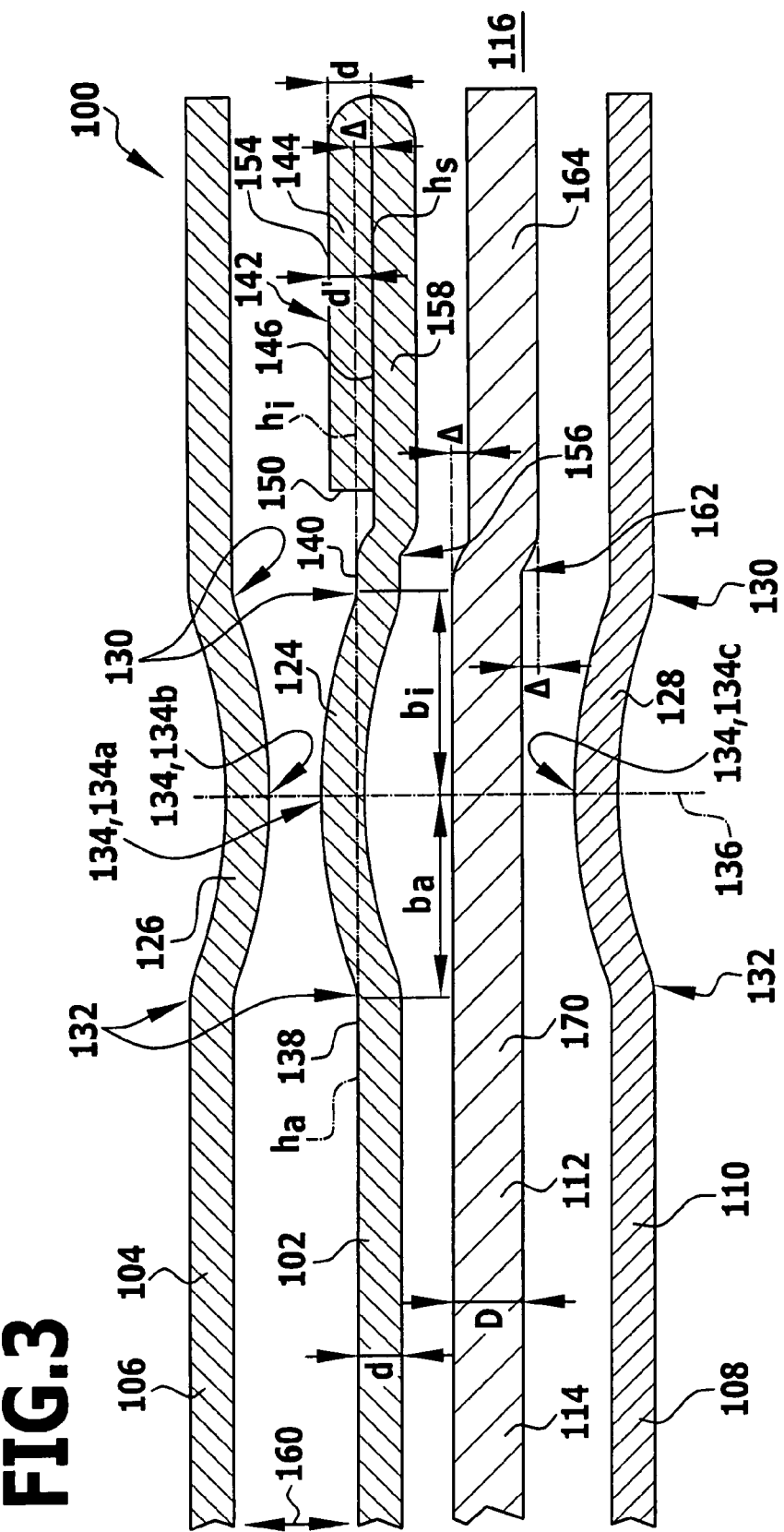
FIG. 3 a diagrammatic cross section through a flat gasket, which comprises the beaded gasket sheet of FIGS. 1 and 2 as well as two further beaded gasket sheets and a offseted carrier sheet, in an edge region of a combustion chamber through-opening, wherein on the gasket sheet provided with the stopper element a offset is provided between an inner bead foot of the sealing bead and the stopper element and the stopper element is disposed at the side of the gasket sheet, towards which the bead crest of the sealing bead is curved.

A first embodiment of a cylinder head gasket that is illustrated in FIGS. 1 to 3 and denoted as a whole by 100 comprises a first metal gasket sheet 102, a second metal gasket sheet 104 in the form of a first cover layer 106 adjacent to the first metal gasket sheet 102, a third metal gasket sheet 108 in the form of a second cover layer 110 disposed at the side of the first metal gasket sheet 102 remote from the first cover layer 106, and a fourth metal gasket sheet 112 in the form of a carrier sheet 114 disposed between the first metal gasket sheet 102 and the second cover layer 110.

All of the sheets or layers of the cylinder head gasket 100 are provided with, in each case, mutually aligned combustion chamber through-openings 116, oil channel or water channel through-openings 118, fastening stud through-openings 120 as well as, in the present example, with a chain case through-opening 122.

The first metal gasket sheet 102 and the two cover layers 106 and 110 are manufactured from a resilient spring steel sheet, for example from a sheet of the spring steel having the material number 1.4310 (DIN 17440 or EN 10088-3).

The spring steel of the material number 1.4310 has the following chemical composition: 0.05 to 0.15% by weight C; max. 2.00% by weight Si; max. 2.00% by weight Mn; max. 0.045% by weight P; max. 0.015% by weight S; 16.00 to 19.00% by weight Cr; max. 0.80% by weight Mo; 6.00 to 9.50% by weight Ni; max. 0.11% by weight N; the remainder being Fe.

The material of the first gasket sheet 102 preferably has a tensile strength of at least 1350 N/mm² and an elongation at break ($A_{80mm}$) with an initial measured length of 80 mm of approximately 5% to approximately 22%.

The thickness d of the gasket sheet 102 and the cover layers 106 and 110 is for example approximately 0.2 mm to approximately 0.25 mm.

The carrier sheet 114 is manufactured from a non-rigid, plastically deformable steel sheet, for example from a sheet of the steel having the material number 1.0338 (EN 10027-2).

The steel having the material number 1.0338 has the following chemical composition: max. 0.08% by weight C; max. 0.4% by weight Mn; max. 0.03% by weight P; max. 0.03% by weight S; the remainder being Fe.

Alternatively, the carrier sheet 114 may be manufactured for example from a sheet of the steel having the material number 1.0330 (EN 10027-2).

The steel having the material number 1.0330 has the following chemical composition: max. 0.120% by weight C; max. 0.045% by weight P; max. 0.045% by weight S; max. 0.600% by weight Mn; the remainder being Fe.

The carrier sheet 114 is preferably manufactured from a metal material that has a relatively low tensile strength (preferably a tensile strength of at most approximately 400 N/mm²) and a higher elongation at break ($A_{80mm}$) with an initial measured length of 80 mm (preferably at least 24%) than the metal material of the resilient, beaded gasket sheets 102, 104 and 108.

Each of the gasket sheets 102, 104 and 108 is provided with at least one bead 124, 126 and 128 respectively, which extends around in each case one of the combustion chamber through-openings 116. It may also be provided that each of the gasket sheets 102, 104 and 108 is provided only with one bead 124, 126 and 128 respectively, which extends around all of the combustion chamber through-openings 116 of the respective gasket sheet.

Each of the beads 124, 126 and 128 takes the form of a full bead and is delimited at its side facing the combustion chamber through-opening 116 by an inner bead foot 130 and at its side remote from the combustion chamber through-opening 116 by an outer bead foot 132. A bead crest 134 extends between the inner bead foot 130 and the outer bead foot 132 of each bead 124, 126 and 128, wherein the bead crest 134a of the bead 124 and the bead crest 134b of the bead 126 are directed towards one another and the bead crest 134c of the bead 128 is curved in the direction of the first gasket sheet 102.

The beads 124, 126 and 128 are designed substantially mirror-symmetrically in relation to a plane 136 extending through their respective bead crest 134 and at right angles to the principal surfaces of the gasket sheets, so that the radial distance $b_i$ between the bead crest 134 and the inner bead foot 130 is substantially equal to the radial distance $b_a$ between the bead crest 134 and the outer bead foot 132.

A part 138 of the surface of the gasket sheet 102 that adjoins the outer bead foot and is situated outside of the bead 124 and disposed at the same side of the gasket sheet 102, towards which the bead crest 134a is curved, lies in relation to a direction 160 at right angles to the principal surfaces of the gasket sheet 102 at the same height level ($h_a$) as a part 140 of the surface of the gasket sheet 102 that adjoins the inner bead foot 130 and is situated likewise outside of the bead 124 (height level $h_i$).

The beads 124, 126 and 128 surrounding the combustion chamber through-openings 116 are elastically vertically deformable.

In order to prevent the beads 124, 126 and 128 from being damaged as a result of the sealing gap variations that occur during operation of the combustion engine, the cylinder head gasket 100 comprises a deformation-limiting device 142, which comprises a stopper element 144 that is disposed on the first gasket sheet 102 and takes the form of an edge region of the first gasket sheet 102 that is turned over along the edge of the combustion chamber through-opening 116 and folded back onto a stopper-supporting surface 146 of the first gasket sheet 102.

The stopper element 144 therefore increases the thickness of the first gasket sheet 102 in the edge region of the combustion chamber through-opening 116, so that the beads 124 and 126 can no longer be unacceptably deformed and therefore cannot be damaged.

In order in this way to be able to manufacture a stopper element 144 of any desired width, in the edge region of the first gasket sheet 102 adjoining the combustion chamber through-opening 116 prior to turning-over of the stopper element 144 a plurality of notches 148 are produced, which, after the stopper element 144 has been turned over onto the stopper-supporting surface 146, extend from the free outer edge 150 of the stopper element 144 radially inwards, i.e. towards the combustion chamber through-opening 116, and are disposed successively and substantially equidistantly along the peripheral direction of the stopper element 144 and the combustion chamber through-opening 116 (see in particular FIG. 2).

The angular distances of the notches 148 disposed successively along the peripheral direction of the combustion chamber through-opening 116 are preferably between approximately 1° and approximately 20°.

The notches 148 are produced for example by incision by means of a mechanical cutting tool, by punching out by means of a mechanical punching tool or by laser cutting by means of a laser beam.

The notches 148 are preferably produced in the stopper element 144 in a substantially material-loss-free manner prior to the turning-over operation.

After the stopper element 144 has been turned over, the lateral edges 152 of the notches 148 extend in a wedge-shaped manner towards one another, as illustrated in FIG. 2.

After the turning-over operation, the mean length L of the notch-free regions of the free outer edge 150 of the stopper element 144 between the notches disposed successively in the longitudinal direction of the stopper element 144 is greater than the mean extent I of the notches 148 in the longitudinal direction of the stopper element 144 at the free outer edge 150 thereof.

As the stopper element 144 is produced by turning over an edge region of the first gasket sheet 102 that adjoins the combustion chamber through-opening 116, the thickness d of the stopper element 144 corresponds to the thickness d of the first gasket sheet 102.

The effective height d' of the stopper element 144 that acts to limit the deformation of the bead 124 corresponds to the projection of the outer surface 154 of the stopper element 144 lying opposite the stopper-supporting surface 146 from the part 138 of the surface of the gasket sheet 102 that adjoins the outer bead foot 132.

In order to reduce this projection d' relative to the thickness d of the gasket sheet 102, the gasket sheet 102 is provided with a offset 156 between the inner bead foot 130 and the free outer edge 150 of the stopper element 144.

This offset 156 is so designed that the offseted region 158 of the gasket sheet 102 situated between the offset 156 and the combustion chamber through-opening 116 is offseted in the direction of the side of the gasket sheet 102 remote from the stopper element 144 by a height Δ relative to the part of the gasket sheet 102 situated radially outside of the delimitation 156.

By means of this offset 156 the stopper-supporting surface 146, which is situated at the height level $h_s$, is shifted in the direction 160, which extends at right angles to the stopper-supporting surface 146, by the offset Δ relative to the part 138 of the surface of the first gasket sheet 102 that adjoins the outer bead foot 132 and is situated outside of the bead 124 and disposed at the same side of the gasket sheet 102 as the stopper-supporting surface 146.

By means of this offset Δ the effective stopper height d' of the stopper element 144 is reduced to the value d-Δ relative to the thickness d of the first gasket sheet 102.

The offset Δ may be for example approximately 20 μm to approximately 40 μm.

So that in the compressed operating state of the cylinder head gasket 100 both the bead feet 130 and 132 of the bead 124 and the offseted region 158 of the first gasket sheet 102 may rest and be supported on the carrier sheet 114, the carrier sheet 114 is also provided with a offset 162, which is of the same height Δ as the offset 156 of the first gasket sheet 102 and is disposed in radial direction between the offset 156 of the first gasket sheet 102 and the bead 124 of the first gasket sheet 102.

The offset 162 is so designed that the offseted region 164 of the carrier sheet 114 adjoining the combustion chamber through-opening 116 is offseted in the direction of the third gasket sheet 108.

The offseted region 164 of the carrier sheet 114 that is supported by the offseted region 158 of the first gasket sheet 102 and by the stopper element 144 therefore acts as a deformation-limiting device for the bead 128 of the third gasket sheet 108, with an effective stopper height corresponding to the height Δ of the offset 162.

The thickness D of the carrier sheet 114 is preferably greater than the thickness of the beaded gasket sheets 102, 104 and 108 and may be for example approximately 0.3 mm to approximately 0.8 mm.

The thickness d of the beaded gasket sheets 102, 104 and 108 is preferably approximately 0.1 mm to approximately 0.3 mm.

The total width ($b_a+b_i$) of the beads 124, 126 and 128 is preferably in the region of approximately 2 mm to approximately 3 mm.

Figure 4:
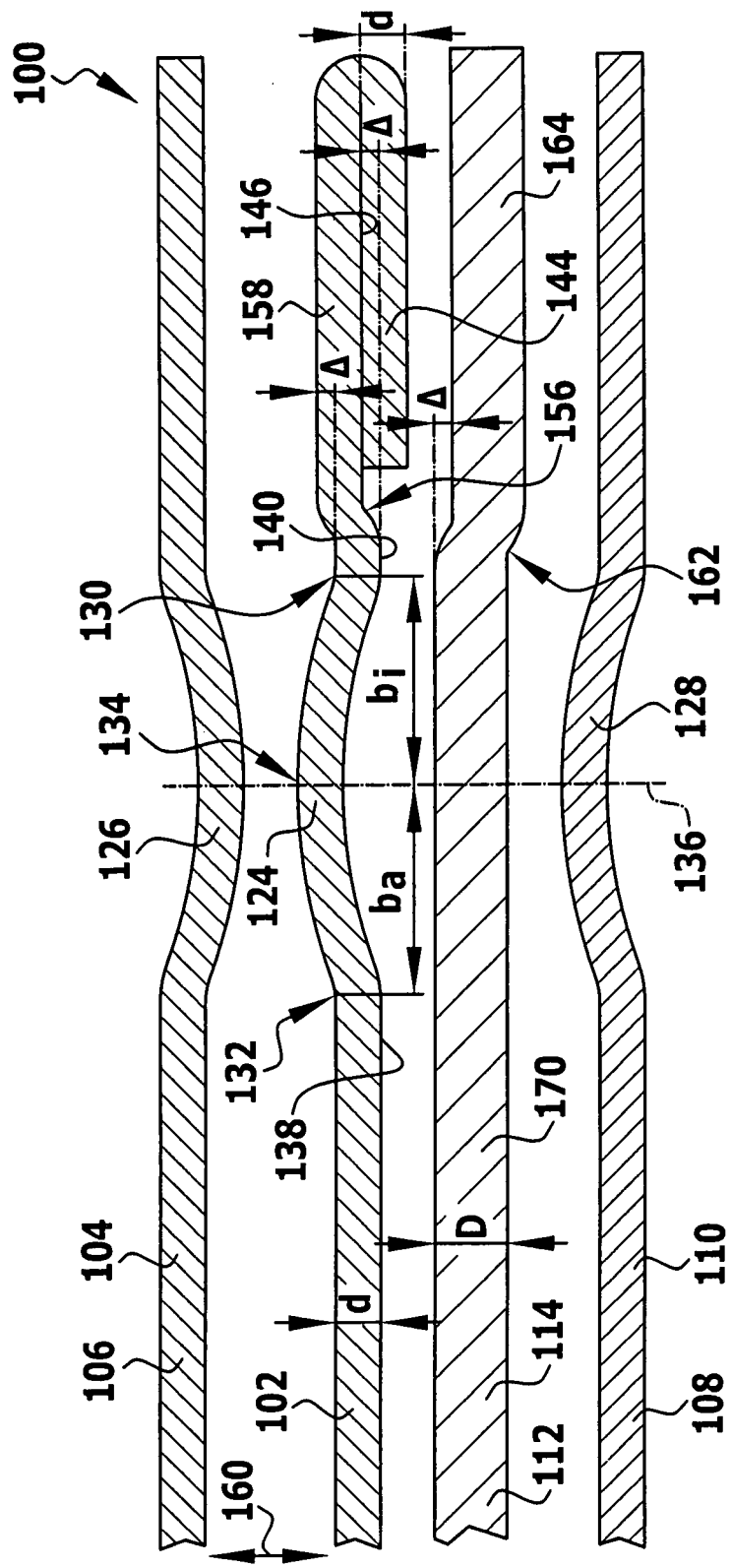
FIG. 4 a diagrammatic cross section corresponding to FIG. 3 through a second embodiment of a flat gasket, in which the stopper element is disposed at the side of the gasket sheet provided with the sealing beads that is remote from the side towards which the bead crest of the sealing bead is curved.

A second embodiment of a cylinder head gasket 100 that is illustrated in FIG. 4 differs from the previously described first embodiment in that the stopper element 144 in this second embodiment is disposed, not on the side of the first gasket sheet 102 facing the first cover layer 106, but instead on the side of the first gasket sheet 102 facing the carrier sheet 114, this being achieved in that the edge region of the first gasket sheet 102 that forms the stopper element 144 has been turned, not upwards, but downwards and folded back onto the first gasket sheet 102.

Consequently, the offset 156 of the first gasket sheet 102 in this case, in order to reduce the effective stopper height of the stopper element 144, is so designed that the offseted region 158 of the first gasket sheet 102 is offseted by the height Δ, not in the direction of the carrier sheet 114, but instead in the direction of the first cover layer 106.

Because of this offset, in this embodiment of the cylinder head gasket 100 the stopper-supporting surface 146 that is now directed towards the carrier sheet 144 is shifted in the direction 160 extending at right angles to the stopper-supporting surface 146 by the offset $\Delta$ relative to the part 138 of the surface of the first gasket sheet 102 that adjoins the outer bead foot 132 and is situated outside of the bead 124 and disposed at the same side of the gasket sheet 102 as the stopper-supporting surface 146.

By means of this offset $\Delta$, the projection of the stopper element 144 from the bead feet 130, 132 at the side of the first gasket sheet 102 facing the carrier sheet 144 is reduced to the value d-$\Delta$.

Otherwise, the second embodiment of a cylinder head gasket 100 illustrated in FIG. 4 is constructionally and functionally identical to the embodiment illustrated in FIGS. 1 to 3 and in this respect reference is made to the previous description thereof.

Figure 5:
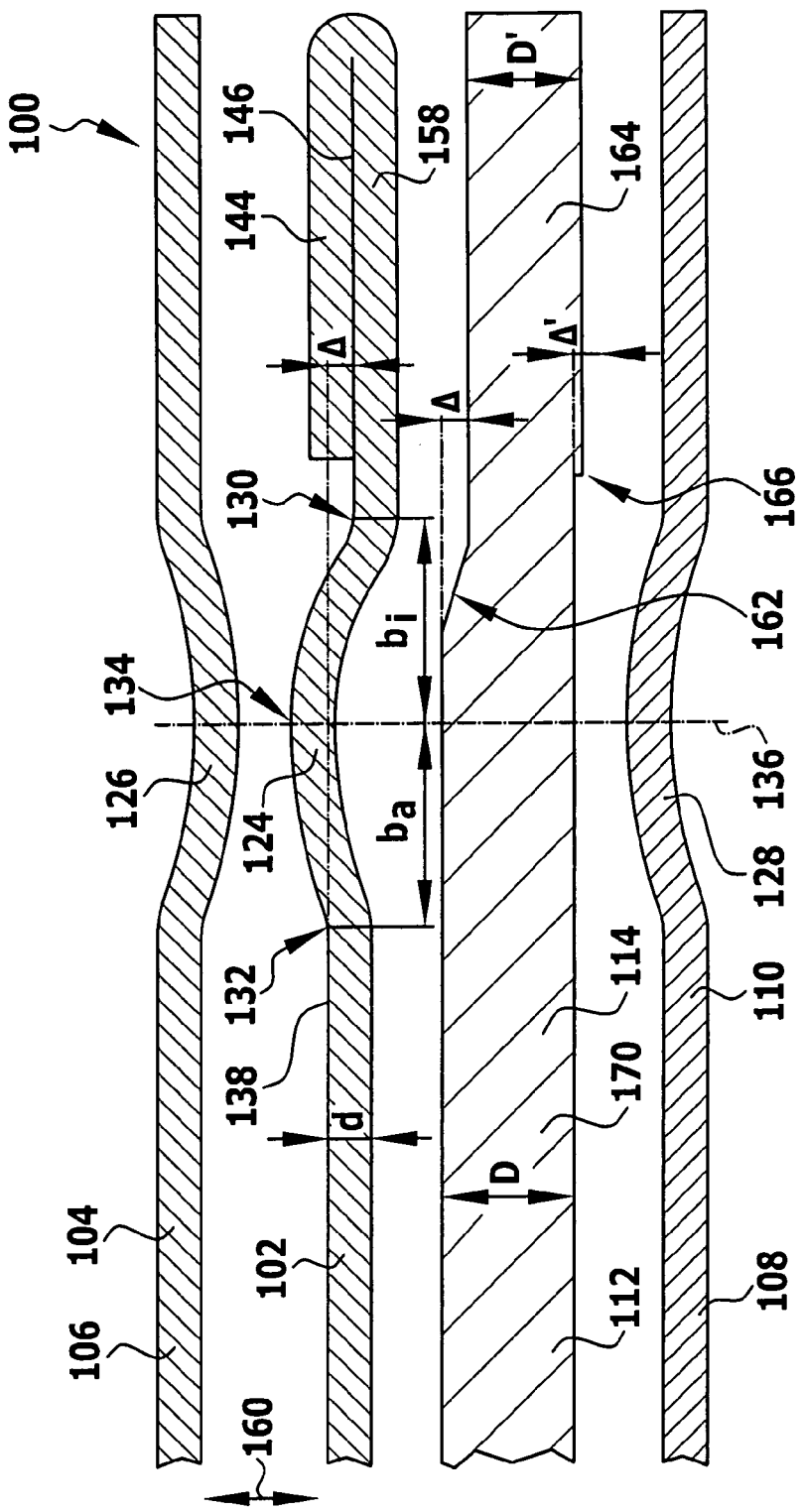
FIG. 5 a diagrammatic cross section corresponding to FIG. 3 through a third embodiment of a flat gasket, in which the sealing bead of the gasket sheet provided with the stopper element is designed asymmetrically in relation to a plane extending through the bead crest at right angles to the principal surfaces of the flat gasket and the carrier sheet at its side facing the gasket sheet with the stopper element is provided with a offset and at the side remote from the gasket sheet with the stopper element is provided with a step.

A third embodiment of a cylinder head gasket 100 that is illustrated in FIG. 5 differs from the first embodiment illustrated in FIGS. 1 to 3 in that the offset $\Delta$ between the stopper-supporting surface 146 and the part 138 of the surface of the first gasket sheet 102 that adjoins the outer bead foot 132 is produced, not by means of a offset between the stopper element 144 and the bead 124 of the first gasket sheet 102, but instead by means of an asymmetrical design of the bead 124.

For this purpose, the bead 124 is so designed that the inner bead foot 130 is situated lower by the offset $\Delta$ than the outer bead foot 132.

The radial distance $b_i$ of the inner bead foot 130 from the bead crest 134 in this embodiment is substantially equal to the radial distance $b_a$ of the outer bead foot 132 from the bead crest 134.

The offset 162 of the carrier sheet 114 in this embodiment is disposed radially outside of the inner bead foot 130 of the first gasket sheet 102, so that the inner bead foot 130 of the bead 124 rest on the region 164 of the carrier sheet 114 that is offseted by the height $\Delta$, while the outer bead foot 132 rests on the non-offseted region of the carrier sheet 114.

Owing to the fact that in this embodiment of the cylinder head gasket 100 the inner bead foot 130 is offset in the direction of the carrier sheet 114 by the height $\Delta$ relative to the outer bead foot 132, the stopper-supporting surface 146, which in this embodiment is remote from the carrier sheet 114, is also offset in the direction 160 extending at right angles to the stopper-supporting surface 146 by the offset $\Delta$ relative to the part 138 of the surface of the first gasket sheet 102 that adjoins the outer bead foot 132 and is situated outside of the bead 124 and disposed at the same side of the gasket sheet 102 as the stopper-supporting surface 146.

The effective stopper height of the stopper element 144 is therefore reduced to the value d-$\Delta$.

The offset 156 that is provided in the first two embodiments between the stopper element 144 and the bead 124 of the first gasket sheet 102 is no longer provided in this embodiment; in principle, it is however also possible to combine an asymmetrical design of the bead 124 with a offset provided between the bead 124 and the stopper element 144 in order to obtain the desired offset $\Delta$.

Furthermore, in the third embodiment illustrated in FIG. 5 the thickness D' of the offseted region 164 of the carrier sheet 114 has been reduced relative to the thickness D of the non-offseted region 170 of the carrier sheet 114 by means of an embossing operation. By means of this embossing operation, the offset of the carrier sheet 114 at the side thereof remote from the first gasket sheet 102 is also reduced to a step 166 of the height $\Delta'$, wherein $\Delta'=\Delta+D'-D$.

The embossing operation of the carrier sheet 114 is moreover carried out in such a way that the step 166 is disposed radially inside of the bead 128 of the second cover layer 110.

In this way, the region of the carrier sheet 114 that is situated radially inside of the step 166 acts as a deformation-limiting device for the bead 128 of the second cover layer 110, wherein the effective stopper height of this deformation-limiting device $\Delta'$ is reduced by the reducing of the thickness of the offseted region 164 of the carrier sheet 114 relative to the height $\Delta$ of the offset 162.

Otherwise, the third embodiment of a cylinder head gasket 100 illustrated in FIG. 5 is constructionally and functionally identical to the first embodiment illustrated in FIGS. 1 to 3 and in this respect reference is made to the previous description thereof.

Figure 6:
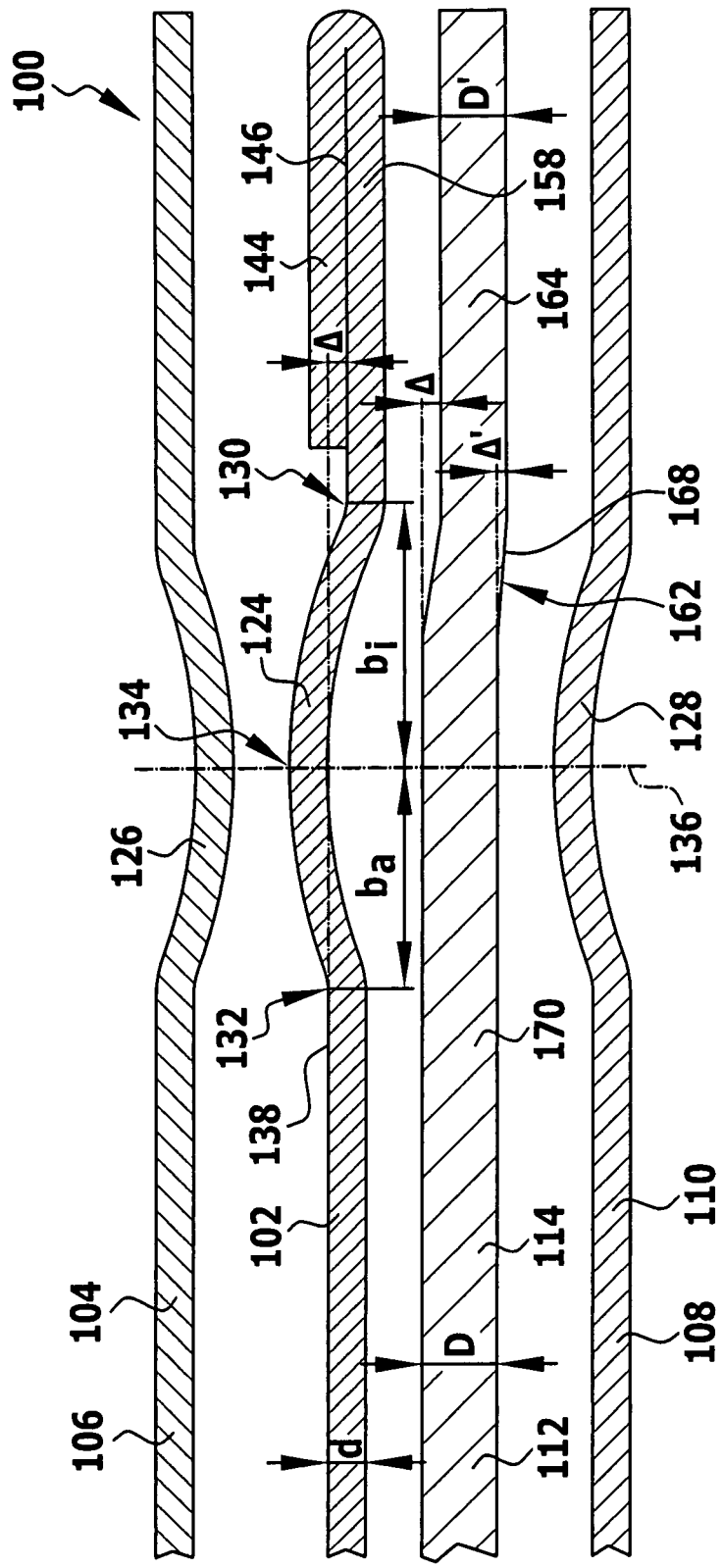
FIG. 6 a diagrammatic cross section corresponding to FIG. 5 through a fourth embodiment of a flat gasket, in which the inner bead foot of the sealing bead is at a greater radial distance from the bead crest than the outer bead foot and the carrier sheet is provided with a offset and in the offseted edge region of the combustion chamber through-opening is reduced to a thickness that is less than the thickness of the carrier sheet outside of the offseted region.

A fourth embodiment of a cylinder head gasket 100 that is illustrated in FIG. 6 differs from the third embodiment illustrated in FIG. 5 in that the bead 124 of the first gasket sheet 102 is designed asymmetrically not only with regard to the height level of the bead feet 130 and 132 but also with regard to the radial distance of the bead feet 130 and 132 from the bead crest 134.

The bead 124 is namely so designed that the inner bead foot 130, which has a greater height difference relative to the bead crest 134, extends at a greater distance $b_i$ from the plane 136 extending through the bead crest 134, while the outer bead foot 132, which has a smaller height difference relative to the bead crest 134, extends at a smaller distance $b_a$ from the plane 136.

The effect that may be achieved by this different width of the bead 124 at the side ($b_i$) facing the combustion chamber through-opening 116, on the one hand, and at the side ($b_a$) remote from the combustion chamber through-opening 116, on the other hand, is that the asymmetrically designed bead 124 has a force-deformation characteristic comparable to a symmetrically designed full bead.

For example, the radial distance $b_i$ of the inner bead foot 130 from the bead crest 134 may be in the region of approximately 1.4 mm to approximately 1.5 mm, while the radial distance $b_a$ of the outer bead foot 132 from the bead crest 134 may be in the region of approximately 1.1 mm to approximately 1.3 mm.

In the fourth embodiment illustrated in FIG. 6 also, the thickness D' of the offseted region 164 of the carrier sheet 114 is reduced relative to the thickness D of the carrier sheet 114 in the non-offseted region 170 thereof by means of an embossing operation.

However, this embossing operation is so designed that, in contrast to the third embodiment illustrated in FIG. 5, it produces, not a step 166 extending at right angles to the principal surface of the carrier sheet 114, but instead a region 168 that is inclined at an acute angle to the principal surface of the carrier sheet 114.

In this embodiment also, the offseted region 164 of the carrier sheet 114 that projects from the lower principal surface of the carrier sheet 114 by the amount $\Delta'=\Delta+D'-D$ forms a deformation-limiting device for the bead 128 of the third gasket sheet 108, with an effective stopper height $\Delta'$ that is reduced relative to the offset $\Delta$.

Otherwise, the fourth embodiment of a cylinder head gasket 100 illustrated in FIG. 6 is constructionally and functionally identical to the third embodiment illustrated in FIG. 5 and in this respect reference is made to the previous description thereof.

Figure 7:
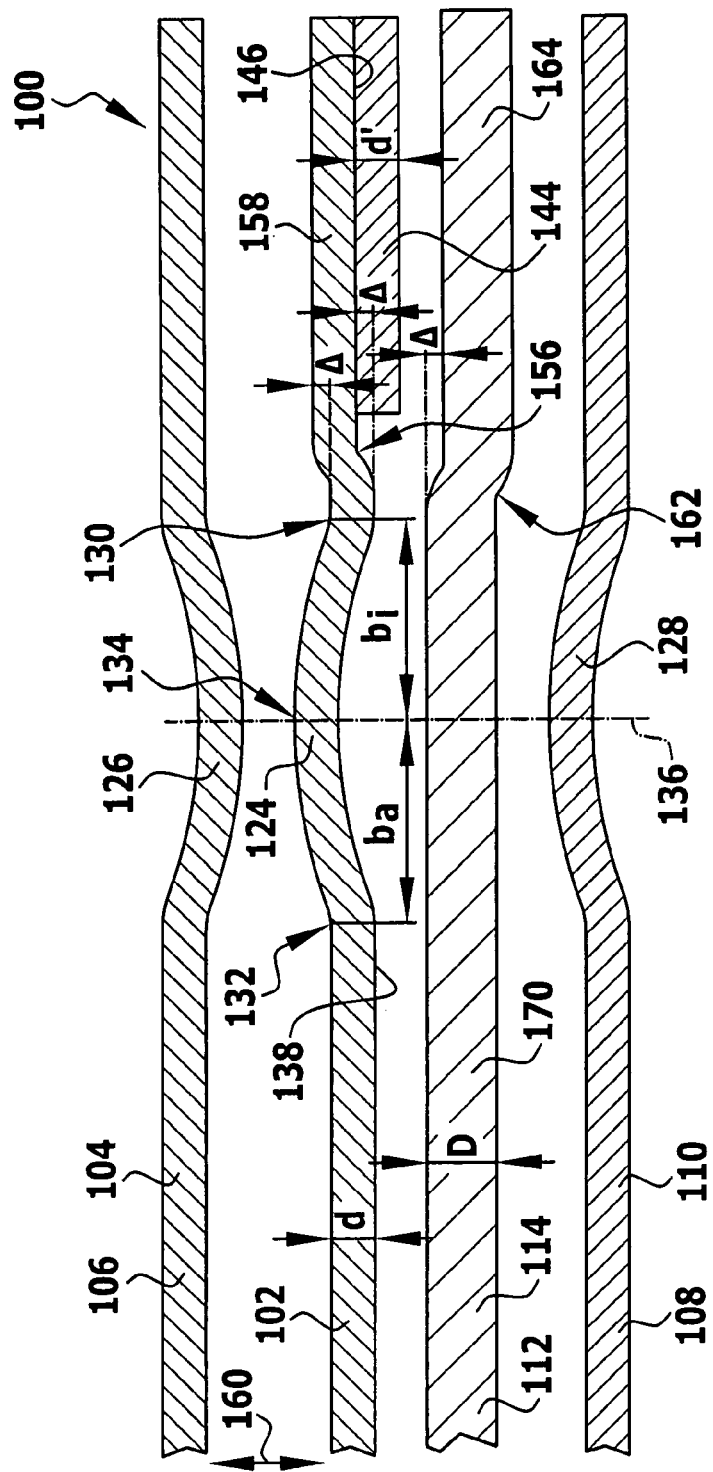
FIG. 7 a diagrammatic cross section corresponding to FIG. 4 through a fifth embodiment of a flat gasket, in which a separately manufactured annular stopper element is welded onto the side of the gasket sheet provided with the sealing bead that is remote from the side, towards which the bead crest of the sealing bead is curved.

A fifth embodiment of a cylinder head gasket 100 that is illustrated in FIG. 7 differs from the second embodiment illustrated in FIG. 4 in that the stopper element 144 takes the form of, not a turned-over edge region of the first gasket sheet 102, but instead an annular element, which has been manufactured separately from the gasket sheet 102 and then laid onto and welded to the stopper-supporting surface 146.

This weld joint may be effected by means of one or more weld lines running continuously around the combustion chamber through-opening 116 or by means of one or more rows of weld points, which run round along the combustion chamber through-opening 116 and in which successive weld points may overlap one another or be disposed separately from one another.

In the embodiment illustrated in FIG. 7, the thickness d' of the welded-on annular stopper element 144 is substantially equal to the thickness d of the first gasket sheet 102.

In principle, it is however also possible to select the thickness d' of the stopper element 144 smaller or greater than the thickness d of the first gasket sheet 102.

Otherwise, the fifth embodiment of a cylinder head gasket 100 illustrated in FIG. 7 is constructionally and functionally identical to the second embodiment illustrated in FIG. 4 and in this respect reference is made to the previous description thereof.

The invention claimed is:

1. A flat gasket, comprising at least one gasket sheet, which comprises at least one through-opening and at least one sealing bead, which extends around the through-opening and is delimited at the side facing the through-opening by an inner bead foot and at the side remote from the through-opening by an outer bead foot and has a bead crest extending between the inner bead foot and the outer bead foot, and at least one deformation-limiting device, which limits the deformation of the sealing bead and comprises at least one stopper element disposed on a stopper-supporting surface of the gasket sheet, wherein the stopper-supporting surface is shifted in a direction extending at right angles to the stopper-supporting surface by an offset relative to a part of the surface of the gasket sheet that adjoins the outer bead foot and is situated outside of the sealing bead and disposed at the same side of the gasket sheet as the stopper-supporting surface, wherein the sealing bead is designed asymmetrically in relation to a plane extending through its bead crest and at right angles to the stopper-supporting surface, wherein the inner bead foot extends at a different height level to the outer bead foot, wherein the flat gasket, besides the gasket sheet that is provided with the sealing bead and the stopper element, additionally comprises at least one carrier sheet with an offset region, wherein the flat gasket comprises at least one further gasket sheet, which is provided with at least one elastically vertically deformable sealing bead extending around the through-opening and is disposed at the side of the carrier sheet that is facing away from the gasket sheet provided with the sealing bead and the stopper element, wherein the offset region of the carrier sheet serves as a deformation-limiting device for the elastically vertically deformable sealing bead of said further gasket sheet, wherein a first side of the offset region of the carrier sheet facing the gasket sheet provided with the sealing bead and the stopper element is offset towards said further gasket sheet by a first offset having a first maximum height ($\Delta$) and a second side of the offset region of the carrier sheet facing towards said further gasket sheet is offset towards said further gasket sheet by a second offset having a second maximum height ($\Delta'$), wherein the second maximum height ($\Delta'$) is smaller than the first maximum height ($\Delta$), and wherein the radial position of the first offset and the radial position of the second offset are both disposed between the through-opening and the radial position of the crest of the sealing bead.

2. The flat gasket according to claim 1, wherein the offset of the stopper-supporting surface is at least approximately 10% of the thickness of the stopper element.

3. The flat gasket according to claim 2, wherein the offset of the stopper-supporting surface is at least approximately 20% of the thickness of the stopper element.

4. The flat gasket according to claim 1, wherein the offset of the stopper-supporting surface is at least approximately 20 µm.

5. The flat gasket according to claim 4, wherein the offset of the stopper-supporting surface is approximately 40 µm.

6. The flat gasket according to claim 1, wherein the offset of the stopper-supporting surface is less than the thickness of the stopper element.

7. The flat gasket according to claim 1, wherein the offset of the stopper-supporting surface is less than approximately 0.3 mm.

8. The flat gasket according to claim 1, wherein the stopper element is disposed at the side of the gasket sheet, towards which the bead crest of the sealing bead is curved.

9. The flat gasket according to claim 1, wherein the flat gasket is of a multi-layered design.

10. The flat gasket according to claim 1, wherein the flat gasket, besides the gasket sheet that is provided with the sealing bead and the stopper element, additionally comprises at least one further gasket sheet, which is provided with at least one sealing bead extending around the through-opening.

11. The flat gasket according to claim 1, wherein the height of the offset of the offset region of the at least one carrier sheet at the side of the carrier sheet facing the gasket sheet provided with the sealing bead and the stopper element corresponds substantially to the offset of the stopper-supporting surface.

12. The flat gasket according to claim 1, wherein the offset region of the carrier sheet that extends around the through-opening has a smaller thickness than the region of the carrier sheet that lies outside of the offset region.

13. The flat gasket according to claim 1, wherein the carrier sheet that is provided with the offset is immediately adjacent to the gasket sheet that is provided with the sealing bead and the stopper element.

14. The flat gasket according to claim 1, wherein the offset region of the carrier sheet is offset in the direction of the side that is remote from the gasket sheet provided with the sealing bead and the stopper element.

15. The flat gasket according to claim 1, wherein the outer bead foot is offset relative to the inner bead foot in the direction of the side of the gasket sheet, towards which the bead crest of the sealing bead is curved.

16. The flat gasket according to claim 1, wherein the distance of the inner bead foot from the bead crest is different from the distance of the outer bead foot from the bead crest.

17. The flat gasket according to claim 16, wherein the distance from the bead crest is greater in the case of the bead foot that has a greater height difference relative to the bead crest than in the case of the bead foot that has a smaller height difference relative to the bead crest.

18. The flat gasket according to claim 1, wherein the stopper element takes the form of a turned-over region of the gasket sheet, which is provided with the sealing bead and the stopper element.

19. The flat gasket according to claim 18, wherein the stopper element has a plurality of notches, which extend from an edge of the stopper element remote from the through-opening out in the direction of the through-opening.

20. The flat gasket according to claim 19, wherein the mean length of the notch-free regions of the edge of the stopper element between the notches disposed successively in the longitudinal direction of the stopper element is greater than the mean extent of the notches in the longitudinal direction of the stopper element at the edge of the stopper element.

21. The flat gasket according to claim 19, wherein the notches are produced by mechanical cutting, by punching or by laser cutting.

22. The flat gasket according to claim 19, wherein the notches are produced by substantially material-loss-free cutting into the gasket sheet.

23. The flat gasket according to claim 1, wherein the flat gasket is a cylinder head gasket.

24. A flat gasket, comprising at least one gasket sheet, which comprises at least one through-opening and at least one sealing bead, which extends around the through-opening and is delimited at the side facing the through-opening by an inner bead foot and at the side remote from the through-opening by an outer bead foot and has a bead crest extending between the inner bead foot and the outer bead foot, and at least one deformation-limiting device, which limits the deformation of the sealing bead and comprises at least one stopper element disposed on a stopper-supporting surface of the gasket sheet, wherein the stopper-supporting surface is shifted in a direction extending at right angles to the stopper-supporting surface by an offset relative to a part of the surface of the gasket sheet that adjoins the outer bead foot and is situated outside of the sealing bead and disposed at the same side of the gasket sheet as the stopper-supporting surface, wherein the sealing bead is designed asymmetrically in relation to a plane extending through its bead crest and at right angles to the stopper-supporting surface, wherein the inner bead foot extends at a different height level to the outer bead foot, wherein the flat gasket, besides the gasket sheet that is provided with the sealing bead and the stopper element, additionally comprises at least one carrier sheet with an offset region, wherein the flat gasket comprises at least one further gasket sheet, which is provided with at least one sealing bead extending around the through-opening and is disposed at the side of the carrier sheet that is facing away from the gasket sheet provided with the sealing bead and the stopper element, wherein the offset region of the carrier sheet serves as a deformation-limiting device for the sealing bead of said further gasket sheet, wherein the flat gasket, besides the gasket sheet that is provided with the sealing bead and the stopper element and said further gasket sheet, additionally comprises at least one further gasket sheet, which is provided with at least one sealing bead extending around the through-opening, wherein a first side of the offset region of the carrier sheet facing towards the gasket sheet provided with the sealing bead and the stopper element is offset towards said further gasket sheet by a first offset having a first maximum height ($\Delta$) and a second side of the offset region of the carrier sheet facing towards said further gasket sheet is offset towards said further gasket sheet by a second offset having a second maximum height ($\Delta'$), wherein the second maximum height ($\Delta'$) is smaller than the first maximum height ($\Delta$), and wherein the radial position of the first offset and the radial position of the second offset are both disposed between the through-opening and the radial position of the crest of the sealing bead.

25. The flat gasket according to claim 24, wherein the flat gasket is a cylinder head gasket.

26. A flat gasket, comprising at least one gasket sheet, which comprises at least one through-opening and at least one sealing bead, which extends around the through-opening and is delimited at the side facing the through-opening by an inner bead foot and at the side remote from the through-opening by an outer bead foot and has a bead crest extending between the inner bead foot and the outer bead foot, and at least one deformation-limiting device, which limits the deformation of the sealing bead and comprises at least one stopper element disposed on a stopper-supporting surface of the gasket sheet, wherein the stopper-supporting surface is shifted in a direction extending at right angles to the stopper-supporting surface by an offset relative to a part of the surface of the gasket sheet that adjoins the outer bead foot and is situated outside of the sealing bead and disposed at the same side of the gasket sheet as the stopper-supporting surface, wherein the sealing bead is designed asymmetrically in relation to a plane extending through its bead crest and at right angles to the stopper-supporting surface, wherein the inner bead foot extends at a different height level to the outer bead foot, wherein the flat gasket, besides the gasket sheet that is provided with the sealing bead and the stopper element, additionally comprises at least one carrier sheet with an offset region, wherein the flat gasket comprises at least one further gasket sheet, which is provided with at least one sealing bead extending around the through-opening and is disposed at the side of the carrier sheet that is facing away from the gasket sheet provided with the sealing bead and the stopper element, wherein the offset region of the carrier sheet serves as a deformation-limiting device for the sealing bead of said further gasket sheet, wherein the stopper element takes the form of a turned-over region of the gasket sheet, which is provided with the sealing bead and the stopper element, wherein a first side of the offset region of the carrier sheet facing towards the gasket sheet provided with the sealing bead and the stopper element is offset towards said further gasket sheet by a first offset having a first maximum height ($\Delta$) and a second side of the offset region of the carrier sheet facing towards said further gasket sheet is offset towards said further gasket sheet by a second offset having a second maximum height ($\Delta'$), wherein the second maximum height ($\Delta'$) is smaller than the first maximum height ($\Delta$), and wherein the radial position of the first offset and the radial position of the second offset are both disposed between the through-opening and the radial position of the crest of the sealing bead.

27. The flat gasket according to claim 26, wherein the flat gasket is a cylinder head gasket.

* * * * *